Figure 1:
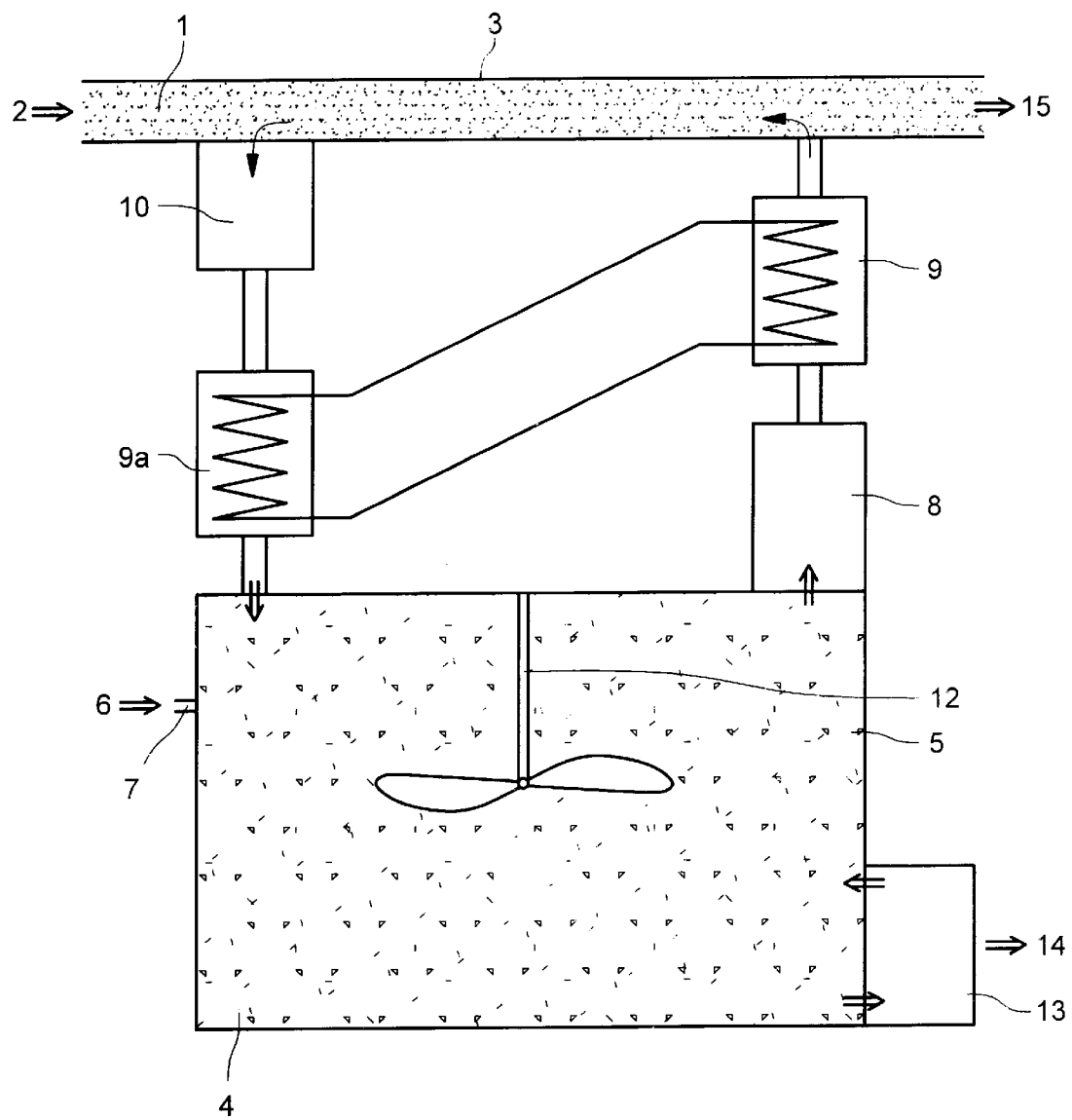

United States Patent [19]

Reuter

[11] Patent Number: 5,872,259

[45] Date of Patent: Feb. 16, 1999

[54] PROCESS FOR SEPARATING A SUBSTANCE FROM AN AGGREGATE MIXTURE

[75] Inventor: Karl Reuter, Germain-en-Laye, France

[73] Assignee: Reuter Chemischer Apparatebau, Germany

[21] Appl. No.: 991,693

[22] Filed: Dec. 16, 1992

[30] Foreign Application Priority Data

Dec. 18, 1991 [GB] United Kingdom ............... 9126832

[51] Int. Cl.$^6$ ........................................... C07D 249/08
[52] U.S. Cl. ............................................ 548/267.8
[58] Field of Search ................................. 548/267.8

[56] References Cited

U.S. PATENT DOCUMENTS

| 3,364,690 | 1/1968 | Torobin | 62/58 |
| 4,144,308 | 3/1979 | Johnson | 422/245 |

FOREIGN PATENT DOCUMENTS 1263697  2/1972  United Kingdom.

*Primary Examiner*—Patricia L. Morris
*Attorney, Agent, or Firm*—Burns, Doane, Swecker & Mathis, L.L.P.

[57] ABSTRACT

A process for separating a desired substance from an aggregate mixture is disclosed.

20 Claims, 1 Drawing Sheet

PROCESS FOR SEPARATING A SUBSTANCE FROM AN AGGREGATE MIXTURE

The invention described herein is in the field of separation processes and relates particularly to a crystallisation process for separating a desired substance from an aggregate mixture of substances.

Conventional crystallisation involves the saturation of a solvent with a solid material, followed by the induction of supersaturation by lowering the temperature or by evaporation of solvent. The crystallisation velocity can be influenced by the rate of cooling or evaporation, i.e. by the degree of distortion of the thermodynamic equilibrium.

The crystallisation rate—or in equilibrium stage the rate of exchange of molecules at the crystal surface—is very high in a conventional crystallisation process and the probability that a "wrong" molecule gets trapped by other molecules is considerable. Therefore the conventional crystallisation process reflects only to a very limited extent the different surface energies of different molecules on a certain crystal as is normally the case with chromatographic processes, and to a certain extent a highly dynamic situation of "trapping molecules" by the layers of the crystal that successively form.

A known separation process is sublimation whereby crystallisation of a desired substance is obtained due to a chemical potential for crystallisation that is maintained by a temperature gradient between a mixture of solid substances and the desired substance in purified crystal form. The vapour pressure of the desired compound and the impurities in the mixture, which can be influenced mainly by temperature, determines the crystallisation rate and purity of the desired substance. A disadvantage of sublimation is that, in practice in order to obtain a sufficient crystal growth rate, normally higher temperatures are required for this process and thereby selectivity is low.

Another known separation process is the extraction of solid materials with liquids e.g. the soxlet-extraction of solids, where one extracted material crystallises. In these processes the chemical potential for the extraction process is introduced by loading (saturating) a liquid with the material to be extracted. A disadvantage of such a process is that the extraction of undesired compounds is not inhibited as there is no equilibrium stage of the undesired compounds between the solid materials and the extraction liquid.

A further known separation process is crystal ripening of an amorphous powder. If an amorphous or glassy fine powder is kept in a liquid in which it is poorly soluble, crystal growth may occur. As long as the powder serves as seeds for the crystallisation process, however, the process will not be selective for particular crystals.

In a "true equilibrium situation" the crystal surface should offer in many cases very selectively an optimum docking place for a molecule of the same species—far better than any chiral phase in chromatography. Such "true equilibrium conditions" are approached in highly diluted solutions. A high degree of selectivity can be obtained in the crystallisation process by further using low temperatures, by offering only the surface of the desired species (selective seeding) and by inhibiting non-seeded crystallization.

The crystallisation process described herein is directed to a process for separating a desired substance from an aggregate mixture comprising forming a three phase system, the first phase comprising the aggregate mixture, the second phase being liquid and comprising a transport phase, and the third phase comprising a surface upon which the desired substance can crystallise, whereby a chemical potential exists for crystal growth of the desired substance in the third phase of the system, thereby creating a flow of the desired substance from the first phase through the second phase to the third phase, where the desired substance crystallises and whereby an equilibrium of the activities of the remaining substances in the aggregate mixture is maintained between the first phase and the second phase.

"Desired substance" as used herein, refers to inorganic and organic substances having a melting point above $-78°$ C., preferably above $-20°$ C. The process of this invention is especially indicated for those substances that have been traditionally difficult to purify, e.g. constitution isomers, stereoisomers i.e. cis/trans isomers, diastereomers, enantiomers etc. and homologues.

The desired substance can be an agrochemical (e.g. fluvalinate, cyproconazole and 2-chloro-N-[1-methyl-2-methoxy]-N-(2,4-dimethylthien-3-yl)acetamide, which is described in U.S. Pat. No. 4,666,502), a pharmaceutical, a dye, a chemical intermediate or the like.

"Aggregate mixture" as used herein refers to a mixture containing the desired substance and one or more impurities.

Where the three phase system of this invention comprises a dispersion, hereinafter described, the aggregate mixture may be partially or completely dissolved in a solvent. Alternately, the aggregate mixture may be in the form of solid particles which may be glassy and non-crystalline and cannot serve as seed crystals, i.e. which are unable to induce crystallisation, in which case no solvent is necessary.

The second phase of the system, which functions as a transport phase through which the desired substance flows before crystallising onto the third phase, can be either a gas or a liquid. Preferably the second phase will be a liquid and will be selected based upon the solubility characteristics of the desired substance. Preferably the desired substance will be substantially insoluble in the second phase.

In such cases where the desired substance is water soluble or substantially water soluble, the second phase is conveniently an organic liquid selected from various classes of poorly water soluble solvents such as alcohols, e.g. (iso-) butanol, (iso-) pentanol, (cyclo-) hexanol etc.; chlorinated hydrocarbons, e.g. chloroform, dichloromethane, trichloroethene, etc.; aromatic solvents, e.g. toluene, xylene, higher alkylated benzenes, furane, etc.; esters, e.g. phtalic acid dimethyl ester, acetic acid n-butyl ester, etc.; ethers, e.g.tert-butyl methyl ether, diisopropyl ether, etc.; ketones, eg. 2-hexanone, isophorone, etc.; paraffins, eg. (cyclo-) hexane, heptane, octane, etc.; and oils, eg. peanut oil, castor oil, cotton seed oil or mineral oil.

In such cases where the desired substance is water insoluble or substantially water insoluble, the second phase is conveniently water.

The second phase may further contain an agent for adjusting the solubility of the desired substance in the second phase and/or the freezing point of the second phase. In such cases where the second phase is water, such agent is conveniently a water soluble inorganic salt such as $CaCl_2$, NaCl, KCl, $MgCl_2$, $AlCl_3$, etc. or a water-miscible organic liquid such as an alcohol, ether, ketone, ester, lactone, DMSO, acetonitrile, etc.

The third phase of the system comprises a surface upon which the desired substance can crystallise. Typically this surface will comprise or be formed from crystals of the desired compound, which are conveniently introduced into the system by seeding with the desired compound or by spontaneous crystallisation of the desired compound due to the chemical potential for such crystallisation. Seeding with e.g. minute, pure crystals of the desired species allows for inducing preferential or completely selective crystallisation.

It is essential that an equilibrium of the activities of the remaining substances in the aggregate mixture is maintained between the first phase and the second phase. This enables the separation process of this application to be highly selective since in this case, unlike in an extraction process, only the desired substance flows continuously from the first phase through the second phase to the third phase. The undesired substances remain in the first phase due to their equilibrium of activities between the first and second phases.

In most systems the spontaneous formation of crystals can be inhibited completely until such time as crystallisation is desired. This can be achieved eg. by a only moderate degree of supersaturation in the second phase (and a corresponding chemical potential generated by the feed mechanism for example by supersaturation in the discontinuous phase of a dispersion, hereinafter described or by the temperature gradient and flow dynamic in a one-interface-system, hereinafter described etc.). In these cases only the seeded compound crystallises.

The crystal growth rate can be optimised by the generated chemical potential for the crystallisation process and by its (normally very limited) solubility in the second phase, which can be managed by a proper choice of solvents and additives (eg. $CaCl_2$ etc. in case of water as second phase).

This crystallisation process can be performed at an independent to choose, optimum, constant temperature within wide limits (eg. $-20°$ to $+80°$ C.). The additives previously mentioned may also serve as antifreeze agents.

This crystallisation process can further be optimised by a proper agitation during the crystallisation (eg. by stirring, shaking or pumping).

After the crystallisation is complete, the precipitate can be obtained by simple filtration and subsequent thoroughly washing with water (eg. removal of the residual emulsion etc.).

Various embodiments of the three phase system of this invention are contemplated.

In one embodiment, the three phase system comprises a dispersion, the first phase being the discontinuous phase of the dispersion, the second phase being the continuous phase of the dispersion.

In such a system, the dispersion may be what is commonly referred to as an "oil-in-water" (O/W) or a "water-in-oil" (W/O). "Oil" as used herein refers to a poorly water soluble solvent e.g. any of the poorly water-soluble solvents that have been previously mentioned in this application. OW and W/O dispersions and methods for forming them are per se known in the art. In the case of an O/W dispersion wherein the oil phase is the discontinuous phase of the dispersion, the aggregate mixture is conveniently combined with a poorly water-soluble solvent such as one of those previously mentioned to form a supersaturated solution of the aggregate mixture.

Alternatively, as previously mentioned the discontinuous phase can comprise an aggregate mixture of solid particles which may be glassy and non-crystalline and which cannot serve as seed crystals, i.e., are not capable of inducing crystallisation, in which case no solvent is necessary.

Preferably the temperature of the dispersion is kept constant. Optionally the dispersion can be agitated to enhance the crystallisation process.

Examples of parameters influencing the crystallisation process when carried out as a dispersion include 1) degree of supersaturation, which influences the crystal growth rate, the rate of spontaneous nucleation and the morphology and regularity of the crystals; 2) dispersion droplet size, which influences the dispersion stability, crystal growth rate and morphology, regularity of the crystals and possibility of crystal growth inside the droplet; 3) choice and amount of solvent in the dispersion droplets, which influences the degree of supersaturation, and thereby the rate of spontaneous nucleation, the crystal growth rate, the theoretical yield of the crystallisation, the viscosity of the dispersion droplets and thereby the crystal growth rate, the partition coefficient of all compounds and thereby the selectivity and purity of the desired crystallisation, by its water solubility also the properties of the water phase, and the morphology and regularity of the crystals; 4) choice of additives in the continuous phase, which influence the partition coefficient of all compounds, cold stability of the continuous phase, dispersion stability, eminently the rate of spontaneous nucleation and the morphology and regularity of the crystals; 5) temperature, which influences the selectivity of the crystallisation process, viscosity of the dispersion (esp. the discontinuous phase), crystal growth rate, theoretical yield and morphology and regularity of the crystals; 6) agitation, which influences the crystal growth rate, morphology and regularity of the crystals; 7) seeding, which influences eminently the selectivity of the crystallisation process, morphology and regularity of the crystals, size of crystals; 8) time, which influences the size of crystals, total yield, selectivity due to the changing ratio between seeded and spontaneous crystallisation.

Preferably, the dispersion is an oil-in-water dispersion. Advantages of the system are the following. The crystallisation takes place in the continuous water phase, since the discontinuous droplets are too small to enable crystallisation inside the droplets, i.e. the chemical potential for forming the desired pure crystal can only be relieved through crystallisation in the water phase. Since the concentration of a poorly water soluble compound in the water phase is very low (eg. 1–500 pm.), the conditions for a crystallisation ex highly diluted solution are achieved by this system, even though the total concentration of the compound to be crystallised may well exceed 20% w/w of the total mixture, and may represent more than 90 weight % of the oil droplets.

Further, the crystallisation can be carried out under optimum conditions: an optimum and constant crystallisation temperature can be chosen and the crystallisation process will proceed continuously at this temperature. Also all other parameters (polarity of the organic phase and water phase, supersaturation of the organic phase etc. and thereby the crystallisation rate) can be varied depending upon the particular substance to be separated.

Moreover, due to the very slow, very constant and easy to control crystal growth rate, the optimised crystallisation temperature and a proper agitation significantly higher purities as well as crystals with much less deformation in lattice and shape compared to conventional crystallisation are obtained by this crystallisation technique.

Additionally, by the degree of supersaturation in the discontinuous phase and by the solubility in the water phase systems can be designed in which no spontaneous formation of crystals occurs. Thus seeding with minute, pure crystals of the desired species allows for selective crystallisation.

Selective seeding with eg. one stereoisomer is easily possible (no danger of undersaturation=dissolution of the seeds).

A considerable amount of organic solvent can be saved as it is replaced by water.

Work up of the crystal precipitate (removal of the solvent etc.) is much easier, since the crystal size may be governed closely and the residual uncrystallised emulsion can easily be filtered and washed away with water.

Since controlled crystallisation can be performed with an even extremely supersaturated discontinuous phase, theoretical yields >95% are possible.

A suitable means of carrying out the invention via a dispersion process is as follows.

A solid mixture of 4 stereoisomers (e.g. two racemic diastereomers) is dissolved in a non- or poorly water soluble solvent or solvent mixture (hereinafter designated oil phase) by heating, high shear equipment and/or ultrasound. Especially by the use of ultrasound considerably supersaturated (hot) solutions can be produced (eg. 10–50 fold). The oil phase may also contain additional surfactant.

Parallel to the organic phase a water phase is prepared, conveniently containing an emulsifying agent (e.g. an emulsifying agent such as a polyvinyl alcohol etc.). Further adjuvants that may be added to the water phase include additional surfactant and/or dispersant, possibly some antifoaming agent, and optionally also various amounts of solubility regulating additives: inorganic salts (eg. $CaCl_2$ etc.) to depress the solubility of the compound to be crystallised in the water phase or organic water soluble solvents (eg. EtOH etc.) to increase the water solubility of the compound to be crystallised. Both additives may also serve as antifreeze, if crystallisation is performed at low temperature.

The (eg. 80° C. hot) oil phase is then emulsified into the (also eg. 80° C. hot) water phase in conventional manner e.g. by use of high shear equipment or ultrasound. The emulsion droplets generated should be less than approx. 1.0 $\mu$m in diameter. If the solvent/surfactant system and the emulsifying conditions are chosen properly, no droplet coalescence should occur for several weeks.

After cooling to the desired crystallisation temperature a few drops of a suspension of finely ground seed crystals of one pure stereoisomer are added. Under optimised conditions the seeded stereoisomer will selectively crystallise within several days while standing, slowly shaking or stirring-the mixture.

A second embodiment contemplated of the invention is one in which the first phase contacts the second phase along a single interface and the first phase is maintained at a temperature higher than the temperature of the second phase. The second phase is preferably agitated or in motion relative to the first phase.

A suitable means of carrying out the invention via a single interface process is as follows.

A solid mixture of four stereoisomers (eg two racemic diastereomers) or a solid mixture of four stereoisomers dissolved or suspended in a non- or poorly water soluble solvent or solvent mixture is placed at the bottom of a trough as first phase (feed) and heated to and kept at approx. 60° C. Then a second layer (water phase) is placed on top (density of first phase must be greater than the density of second phase), which may contain various amounts of solubility regulating additives (eg. inorganic salts like $CaCl_2$ etc., to depress the solubility of the compound to be crystallised in the water phase or organic, water soluble solvents like EtOH etc. to increase the water solubility of the compound to be crystallised). Both additives may also serve as antifreeze, if crystallisation is performed at low temperature. The second phase is slowly agitated and kept at a constant temperature of approx. 20° C.

Then a few drops of a suspension of finely ground seed crystals of one pure stereoisomer are added to the second phase. Depending on the temperature gradient maintained and depending on the agitation, an exact degree of supersaturation can be generated in the second phase and under optimised conditions the seeded stereoisomer will selectively crystallise at a very constant rate.

The above described single interface crystallisation process can also be carried out as a continuous process.

An example of such a continuous process may be illustrated by reference to FIG. 1.

FIG. 1 is a schematic view of an equipment suitable for continuous 3-phase crystallisation.

Referring now to FIG. 1, the first phase 1 is introduced as coarse solid particles (or in another appropriate form, suitable for use in the equipment according to FIG. 1 or modifications thereof such as a coarse solid carrier coated by an aggregate liquid mixture, or as a viscous or pasty mash or a liquid) and employing conventional means, such as a paddle mill—through entrance 2 of an appropriate container or column 3 and transported therethrough. First phase 1 is heated e.g. at a temperature of 50° C.

The transport phase 4 is kept in a container 5 into which the third phase 6 is introduced, e.g. in the form of a seed suspension, through an appropriate entrance 7. The transport phase 4 is kept at a temperature below that of the first phase 1, e.g. at 20° C. A small fraction of the second phase 4 is pumped through a filter 8, i.a. to withhold any crystals formed in the transport phase 4, through a heat exchanger 9 to increase the temperature of the transport phase 4, to that of the first phase 1 and then through column 3 containing the material to be purified 1. After contact of transport phase 4 with the first phase 1 over a sufficient column length, transport phase 4 is pumped through filter 10 and heat exchanger 9a, to reduce the temperature of the transport phase back to its original temperature (in this example from 50° C. to 20° C.). The transport phase 4 in container 5 is conveniently stirred, employing e.g. a conventional stirrer 12. Crystals formed are separated by conventional means, employing e.g. a crystal separator 13 and a crystal carry out 14 (not shown). Waste material 15 is discarded.

The thus described equipment for continuous supersaturation by heating/cooling may be adapted in conventional manner to an equipment suitable for continuous supersaturation employing ultrasound in addition to or instead of heating/cooling.

The equipment shown in FIG. 1 offers also the possibility to work with an emulsion on a continuous scale. In this case, the phase in container 5 is an emulsion (4). The filtered emulsion 4 is pumped through the equipment in the same way as discussed above and is each time reloaded, i.e. again supersaturated by contact with the crude starting material 1 by a heating/cooling process and/or by ultrasound.

It will be appreciated that FIG. 1 is only shown and discussed to the extent that it is necessary to explain the basic principles of the process of the invention. Many modifications, adaptions (e.g. pump systems) and extra alternative arrangements of the equipment shown in FIG. 1 will become obvious for the skilled person from the above discussion. For example, the phases 1 and 4 do not necessarily have to move counter current, they may also move into the same direction, in which case the phases should preferably move with different velocity to allow both, optimum use of phase 1 and optimum supersaturation of phase 4. These and other variations are well within the skill of the art and form part of the invention.

In the following examples r.t. is room temperature.

EXAMPLES

Example 1

20,0 g of technical Cyproconazole (94,95% purity, diastereomeric ratio=1,14) and 0,5 g of Aerosol OT 70 PG (surfactant) are dissolved in 15,0 g cyclohexanol by treatment with an ultrasonic finger for 5 min. (the sample heats up to approx. 80° C.).

A second solution is prepared by dissolving 2,0 g polyvinylalcohol (Hoechst MOVIOL 3-83) and 15,0 g technical grade $CaCl_2$ in 47,5 g water also by treatment with an ultrasonic finger for 5 min. (the sample heats up to approx. 80° C.).

Then the hot organic phase is dispersed into the hot water phase by magnetic stirring and treatment with an ultrasonic finger for 5 min.

After cooling to r.t. the resulting emulsion is seeded with 3 drops of a dilute, finely ground suspension of 94,95% pure Cyproconazole (diastereomeric mixture) and stored for 17 days at r.t. After dilution with water, filter suction and drying 3,74 g (19.7% yield, 23,5% of theoretical yield) Cyproconazole of 99,0% purity, diastereomeric ratio=of Diastereomer A: Diastereomer B=1,07, is recovered as very regular prisms and needles.

Example 2

8,33 g of technical Cyproconazole (94,95% purity, diastereomeric ratio of Diastereomer A: Diastereomer B=1,14 each Diastereomer consisting of equal amounts of its enantiomers) and 0,5 g of Aerosol OT 70 PG (surfactant) are dissolved in 3,33 g Cyclohexanol by treatment with an ultrasonic finger for 5 min. (the sample heats up to approx. 80° C.).

A second solution is prepared by dissolving 2,0 g polyvinylalcohol (Hoechst MOVIOL 3-83) and 36,5 g technical grade $CaCl_2$ in 49,3 g water also by treatment with an ultrasonic finger for 5 min. (the sample heats up to approx. 80° C.).

Then the hot organic phase is dispersed into the hot water phase by magnetic stirring and treatment with an ultrasonic finger for 5 min.

After cooling to r.t. the resulting emulsion is seeded with 3 drops of a dilute, finely ground suspension of the pure $B_1$ isomer of Cyproconazole and shaken for 4 days by a TURBULA mixer at r.t. After dilution with water, filter suction and drying 0,35 g (4,4% yield, 4,8% of theoretical yield) Cyproconazole of 98,9% purity, containing 16% $A_1$ isomer, 16% $A_2$ isomer. 61% $B_1$ isomer and 7% $B_2$ isomer is recovered as very regular cuboids with bevelled corners. The diastereomeric ratio of Diastereomer A: Diastereomer B=0.43; the enantiomeric excess of $B_1$, determined by GC, is 79%.

Example 3—Crystallisation of Tau-fluvalinate

Tau-fluvalinate is the common name for (RS)-α-cyano-3-phenoxybenzyl N-(2-chloro-α,α,α-trifluoro-p-tolyl)-D-valinate.

The present example employs pre-purified technical Tau-fluvalinate as starting material. Said technical Tau-fluvalinate employed herein comprises a mixture of 89.10% Tau-fluvalinate consisting of 92.9% (S)-α-cyano-3-phenoxy-benzyl N-(2-chloro-α,α,α-trifluoro-p-tolyl)-D-valinate and 7.1% (R)-α-cyano-3-phenoxy-benzyl N-(2-chloro-α,α,α-trifluoro-p-tolyl)-D-valinate. The diastereomeric excess (92.9% S-D form minus 7.1% R-D form) of the technical Tau-fluvalinate employed is accordingly 86%.

810 mg of the above defined technical Tau-fluvalinate are dissolved in 2.0 g hexane with an ultrasonic finger for 2 min (the sample heats up to approximately 40° C.).

A second solution is prepared by dissolving 0.5 g polyvinyl alcohol (MOVIOL 3-83, Hoechst) and 0.5 g Aerosol OT (dioctylsulfosuccinate, Am. Cyanamid) in 96.19 g water also by treatment with an ultrasonic finger for 5 minutes. Then the organic phase is dispersed into the water phase by magnetic stirring and ultrasound (5×1 minute, 50° C.).

The obtained emulsion is stirred by a glass stirrer at 500 rpm for 21 d at 5° C. After addition of 300 ml water, vigorously shaking, filter suction, washing with 2×30 ml water, drying at r.t. very regular needles of (S)-α-cyano-3-phenoxybenzyl N-(2-chloro-α,α,α-trifluoro-p-tolyl)-D-valinate crystals are obtained with a purity of >99%.

What is claimed is:

1. A process for separating a desired substance from an aggregate mixture comprising forming a three phase system, the first phase comprising the aggregate mixture, the second phase being liquid and comprising a transport phase, and the third phase comprising a surface upon which the desired substance can crystallise, whereby a chemical potential exists for crystal growth of the desired substance in the third phase of the system, thereby creating a flow of the desired substance from the first phase through the second phase to the third phase, where tile desired substance crystallises and whereby an equilibrium of tile activities of the remaining substances in the aggregate mixture is maintained between the first phase and the second phase.

2. A process according to claim 1 wherein the desired substance is substantially insoluble in the second phase.

3. A process according to claim 1 wherein the third phase is formed by introducing seed crystals of the desired substance into the second phase.

4. A process according to claim 1 wherein the third phase is formed by spontaneous crystallisation of the desired substance in the second phase.

5. A process according to claim 1 wherein the second phase further comprises an agent for adjusting the solubility of the substance in the continuous phase and/or the freezing point of the continuous phase.

6. A process according to claim 1 wherein the desired substance comprises an organic compound.

7. A process according to claim 6 wherein the organic compound is selected from fluvalinate, Tau-fluvalinate, cyproconazole and 2-chloro-N-[1-methyl-2-methoxy]-N-(2,4-dimethyl-thien-3-yl) acetamide.

8. A process according to claim 1 wherein the first phase contacts the second phase along a single interface or in a separate column and the phase contact zone is maintained at a temperature higher than the temperature of the second phase in which crystallization occurs.

9. A process according to claim 1 wherein the first phase is the discontinuous phase and the 2nd phase the continuous phase of an emulsion, and which comprises reloading the emulsion by contacting it with the crude starting material contained in a separate container or column.

10. A process according to claim 8 wherein the first phase is the discontinuous phase and the 2nd phase the continuous phase of an emulsion, and which comprises reloading the emulsion by contacting it with the crude starting material contained in a separate container or column.

11. A process according to claim 1 wherein the three phase system comprises a dispersion, the first phase being the discontinuous phase of the dispersion, the second phase being the continuous phase of the dispersion.

12. A process according to claim 8 wherein the three phase system comprises a dispersion, the first phase being the discontinuous phase of the dispersion, the second phase being the continuous phase of the dispersion.

13. A process according to claim 11 wherein the temperature of the dispersion is kept constant.

14. A process according to claim 12 wherein the temperature of the dispersion is kept constant.

15. A process according to claim 13 wherein the dispersion comprises an oil-in-water dispersion or a water-in-oil dispersion.

16. A process according to claim 14 wherein the dispersion comprises an oil-in-water dispersion or a water-in-oil dispersion.

17. A process according to claim 15 wherein the dispersion is agitated.

18. A process according to claim 16 wherein the dispersion is agitated.

19. A process according to claim 1 wherein the discontinuous phase comprises a supersaturated solution of the aggregate mixture.

20. A process according to claim 1 wherein the discontinuous phase comprises an aggregate mixture of solid particles.

* * * * *